(12) United States Patent
Meiri et al.

(10) Patent No.: US 11,238,063 B2
(45) Date of Patent: Feb. 1, 2022

(54) PROVENANCE-BASED REPLICATION IN A STORAGE SYSTEM

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 439 days.

(21) Appl. No.: 16/521,728

(22) Filed: Jul. 25, 2019

(65) Prior Publication Data

US 2021/0026867 A1     Jan. 28, 2021

(51) Int. Cl.
     *G06F 16/27*     (2019.01)
     *G06F 16/23*     (2019.01)

(52) U.S. Cl.
     CPC ........ *G06F 16/275* (2019.01); *G06F 16/2365* (2019.01)

(58) Field of Classification Search
     CPC ........................... G06F 16/275; G06F 16/2365
     USPC ........................................................ 707/611
     See application file for complete search history.

(56) References Cited

U.S. PATENT DOCUMENTS

| | | |
|---|---|---|
| 6,496,908 B1 | 12/2002 | Kamvysselis et al. |
| 6,553,464 B1 | 4/2003 | Kamvysselis et al. |
| 6,640,280 B1 | 10/2003 | Kamvysselis et al. |
| 6,862,632 B1 | 3/2005 | Halstead et al. |
| 6,883,018 B1 | 4/2005 | Meiri et al. |
| 6,886,164 B2 | 4/2005 | Meiri |
| 6,898,685 B2 | 5/2005 | Meiri et al. |
| 6,910,075 B2 | 6/2005 | Marshak et al. |
| 6,938,122 B2 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |

(Continued)

OTHER PUBLICATIONS

U.S. Appl. No. 15/001,789, filed Jan. 20, 2016, Meiri et al.

(Continued)

*Primary Examiner* — Hicham Skhoun
(74) *Attorney, Agent, or Firm* — Daly, Crowley, Mofford & Durkee, LLP

(57) ABSTRACT

In one aspect, provenance-based replication includes assigning a GUID to a first snap tree of a first storage array and another GUID to a second snap tree of a second storage array. The trees are peers of each other with respect to at least one volume replicated between the arrays. For each volume in the first array that is replicated to a volume in the second array, an aspect includes assigning a volume pairing identifier common to both volumes. Upon determining data for a volume (V1) in the first array has been lost/corrupted, an aspect includes identifying the peer tree from the GUID and using the pairing ID of V1 to search the peer tree for a volume (V2) in the second array, retrieving data for V2, computing a delta between the data of V1 and the data of V2, and reconstructing the lost/corrupted data for V1 using the delta.

20 Claims, 7 Drawing Sheets

(56) References Cited

U.S. PATENT DOCUMENTS

| | | |
|---|---|---|
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,483,923 B2 * | 1/2009 | Novik .................... H04L 69/08 |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,721,057 B2 * | 5/2010 | Berkowitz ............ G06F 3/0601 |
| | | 711/162 |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,782,357 B2 | 7/2014 | Halstead et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,304,889 B1 | 4/2016 | Chen et al. |
| 9,323,750 B2 | 4/2016 | Natanzon et al. |
| 9,323,758 B1 * | 4/2016 | Stacey ................ G06F 16/1748 |
| 9,342,465 B1 | 5/2016 | Meiri |
| 9,378,106 B1 | 6/2016 | Ben-Moshe et al. |
| 9,396,205 B1 * | 7/2016 | Lewis .................. G06F 16/182 |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,632,892 B1 * | 4/2017 | Sledz .................... G06F 16/178 |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,140,303 B1 * | 11/2018 | Patterson ............ G06F 11/1464 |
| 10,146,629 B1 * | 12/2018 | Yadav ................ G06F 11/1461 |
| 10,152,527 B1 | 12/2018 | Meiri et al. |
| 10,238,487 B2 | 3/2019 | Alon et al. |
| 10,261,853 B1 | 4/2019 | Chen et al. |
| 11,086,545 B1 * | 8/2021 | Dayal .................... G06F 3/0613 |
| 2004/0148317 A1 * | 7/2004 | Sundararajan ........ G06F 16/275 |
| 2007/0179994 A1 * | 8/2007 | Deguchi ............ G06F 11/1471 |
| 2008/0104132 A1 * | 5/2008 | Toner .................... G06F 16/119 |
| 2009/0006495 A1 * | 1/2009 | Ramasubramanian ...................... |
| | | G06F 16/27 |
| 2011/0197039 A1 * | 8/2011 | Green .................... G06F 3/067 |
| | | 711/162 |
| 2013/0073519 A1 * | 3/2013 | Lewis .................... G06F 3/067 |
| | | 707/610 |
| 2014/0108341 A1 * | 4/2014 | Marsden ............... G06F 16/275 |
| | | 707/623 |
| 2015/0066858 A1 * | 3/2015 | Sabdar ................. G06F 16/128 |
| | | 707/639 |
| 2015/0127618 A1 * | 5/2015 | Alberti ..................... G06F 8/63 |
| | | 707/678 |
| 2020/0192594 A1 * | 6/2020 | Balachandran ....... G06F 3/0647 |

OTHER PUBLICATIONS

U.S. Appl. No. 15/085,188, filed Mar. 30, 2016, Meiri et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/395,595, filed Apr. 26, 2019, Meiri et al.
U.S. Appl. No. 16/396,880, filed Apr. 29, 2019, Meiri et al.
U.S. Appl. No. 16/398,595, filed Apr. 30, 2019, Kucherov et al.

* cited by examiner

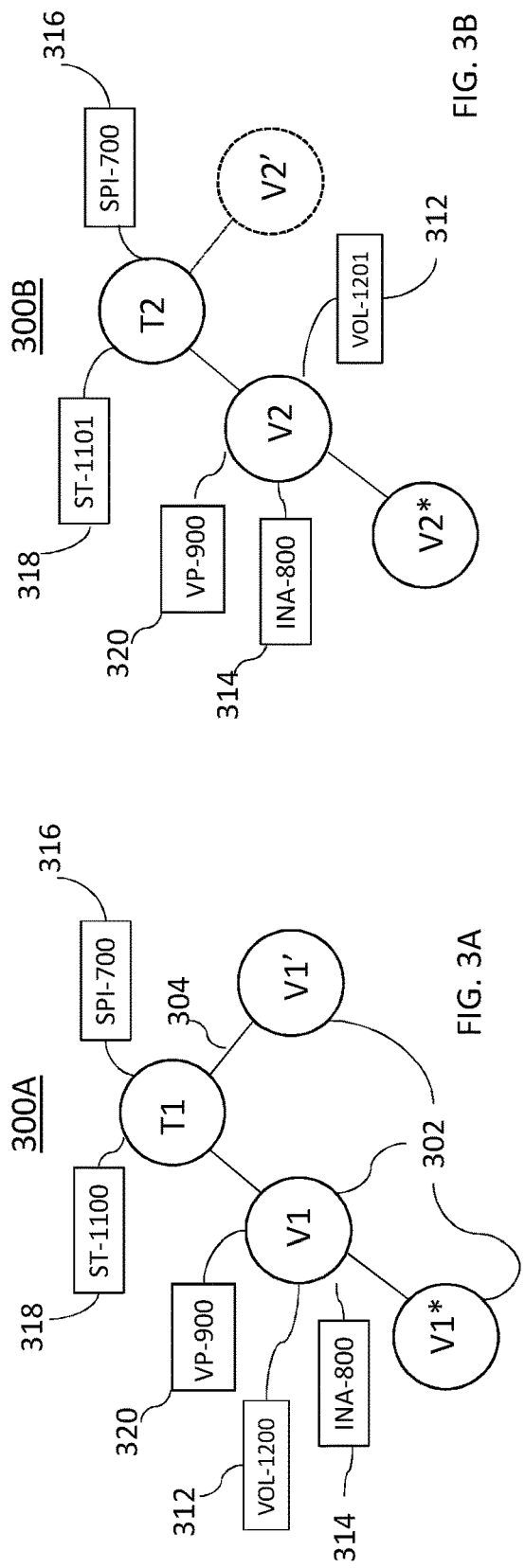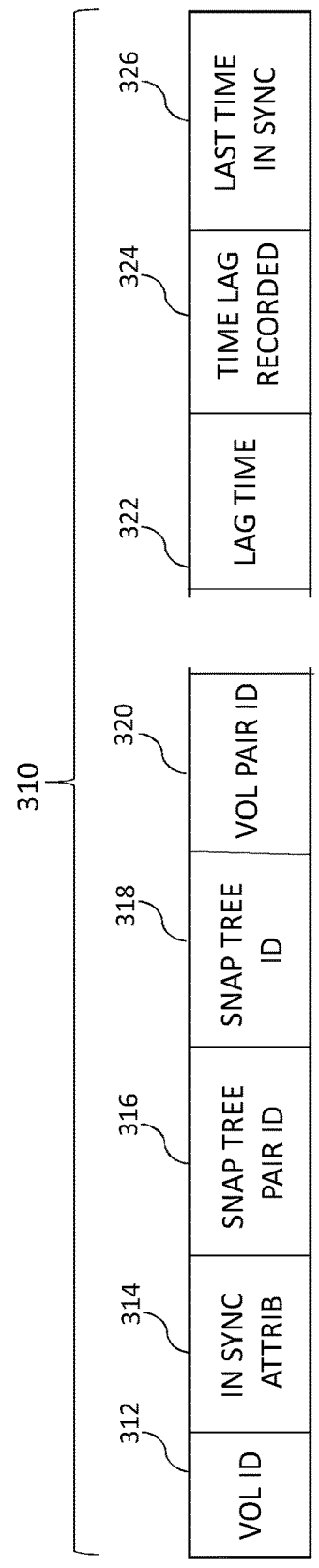
FIG. 3A
FIG. 3B
FIG. 3C

PROVENANCE-BASED REPLICATION IN A STORAGE SYSTEM

BACKGROUND

Data replication techniques enable the sharing of data across systems to ensure consistency between system components, which can lead to greater reliability, fault-tolerance, and accessibility. There are several types of replication: synchronous (sync) replication, active/active (metro) replication, and asynchronous (async) replication, each with associated advantages and disadvantages.

Synchronous (sync) replication is a business continuity process that mirrors data updates between two systems to prevent data loss and downtime. When sync replication is turned on for a production storage object, the system mirrors the data to a target system as part of handling write requests from an initiator, and only responds to the initiator after the writes have been persisted on both the source and target systems. In active/active replication, all requests are load-balanced across all available resources. When a failure occurs on one resource, another resource can take over processing. Asynchronous replication is a data storage backup technique where data is not immediately backed up during or immediately after the primary storage acknowledges write complete, but rather done over a period of time. This method results in a system with good performance and lesser bandwidth requirement, but the backups are not immediately available if something happens to the primary storage. The greater the distance between the primary and secondary data center is too great, the delay in acknowledgement caused by synchronous replication can make it unusable for some applications.

In a storage system that performs snapshot replication, there are typically iterations of the data during a replication cycle in which new data (e.g., a most recent snapshot of a volume or a delta between consecutive snapshots) is saved with previous versions of the data (e.g., earlier snapshots and/or deltas between snapshots). In this manner, in the event of a failover or other loss, previously stored or captured snapshots/deltas can be used to reconstruct any data that may have been lost. However, in a large storage environment where large numbers of volumes and snapshots are maintained and updated over time, tracking and managing this information can be challenging. For instance, two seemingly independent volumes on a target site may be related by being snapshots of the same volume on a source site at different times; however, without additional information that connects them, their relationship may go undetermined throughout a replication process. The same issue applies, e.g., when a snapshot of a volume becomes an independent volume with a new identity. In these cases and others, the volumes may have related data or even identical data, but the relationships may go unnoticed to the system. If the system was provided with relationship information about these volumes, their common data could be useful in performing various operations, such as recovery and improved data transfer.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for performing provenance-based replication in a storage system. The method includes assigning a globally unique identifier (GUID) to a first snap tree of a first storage array and another GUID to a second snap tree of a second storage array. The first snap tree and the second snap tree are peers of each other with respect to at least one volume replicated between the first storage array and the second storage array. For each volume (Vj) of a plurality of volumes in the first storage array that is replicated to a corresponding volume (Vi) of a plurality of volumes in the second storage array, the method includes assigning a volume pairing identifier (ID) common to both of the volume Vj and the volume Vi. Upon determining data for a volume (V1) of the plurality of volumes in the first storage array has been lost or corrupted, the method further includes identifying the peer snap tree from the GUID of the peer snap tree and using the volume pairing ID of the volume V1 to search the peer snap tree for a volume (V2) of the plurality of volumes in the second storage array. The volume V2 shares the volume pairing ID of the volume V1. The method also includes retrieving data for the volume V2, computing a delta between the data of the volume V1 and the data of the volume V2, and reconstructing the lost or corrupted configuration data for the volume V1 using the delta.

Another aspect may provide a system performing provenance-based replication in a storage system. The system includes a memory having computer-executable instructions. The system also includes a processor operated by a storage system. The processor executes the computer-executable instructions. When executed by the processor, the computer-executable instructions cause the processor to perform operations. The operations include assigning a globally unique identifier (GUID) to a first snap tree of a first storage array and another GUID to a second snap tree of a second storage array. The first snap tree and the second snap tree are peers of each other with respect to at least one volume replicated between the first storage array and the second storage array. For each volume (Vj) of a plurality of volumes in the first storage array that is replicated to a corresponding volume (Vi) of a plurality of volumes in the second storage array, the operations include assigning a volume pairing identifier (ID) common to both of the volume Vj and the volume Vi. Upon determining data for a volume (V1) of the plurality of volumes in the first storage array has been lost or corrupted, the operations further include identifying the peer snap tree from the GUID of the peer snap tree and using the volume pairing ID of the volume V1 to search the peer snap tree for a volume (V2) of the plurality of volumes in the second storage array. The volume V2 sharing the volume pairing ID of the volume V1. The operations also include retrieving data for the volume V2, computing a delta between the data of the volume V1 and the data of the volume V2; and reconstructing the lost or corrupted data for the volume V1 using the delta.

Another aspect may provide a computer program product for performing provenance-based replication in a storage system. The computer program product is embodied on a non-transitory computer readable medium. The computer program product includes instructions that, when executed by a computer at a storage system, causes the computer to perform operations. The operations include assigning a globally unique identifier (GUID) to a first snap tree of a first storage array and another GUID to a second snap tree of a second storage array. The first snap tree and the second snap tree are peers of each other with respect to at least one volume replicated between the first storage array and the second storage array. For each volume (Vj) of a plurality of volumes in the first storage array that is replicated to a corresponding volume (Vi) of a plurality of volumes in the second storage array, the operations include assigning a volume pairing identifier (ID) common to both of the volume Vj and the volume Vi. Upon determining data for a volume (V1) of the plurality of volumes in the first storage array has been lost or corrupted, the operations further include identifying the peer snap tree from the GUID of the peer snap tree and using the volume pairing ID of the volume V1 to search the peer snap tree for a volume (V2) of the plurality of volumes in the second storage array. The volume V2 sharing the volume pairing ID of the volume V1. The operations also include retrieving data for the volume V2, computing a delta between the data of the volume V1 and the data of the volume V2, and reconstructing the lost or corrupted data for the volume V1 using the delta.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIGS. 3A-3B illustrate data structures and FIG. 3C illustrates attributes for managing provenance information used to perform provenance-based replication in accordance with an illustrative embodiment;

Figure 4:
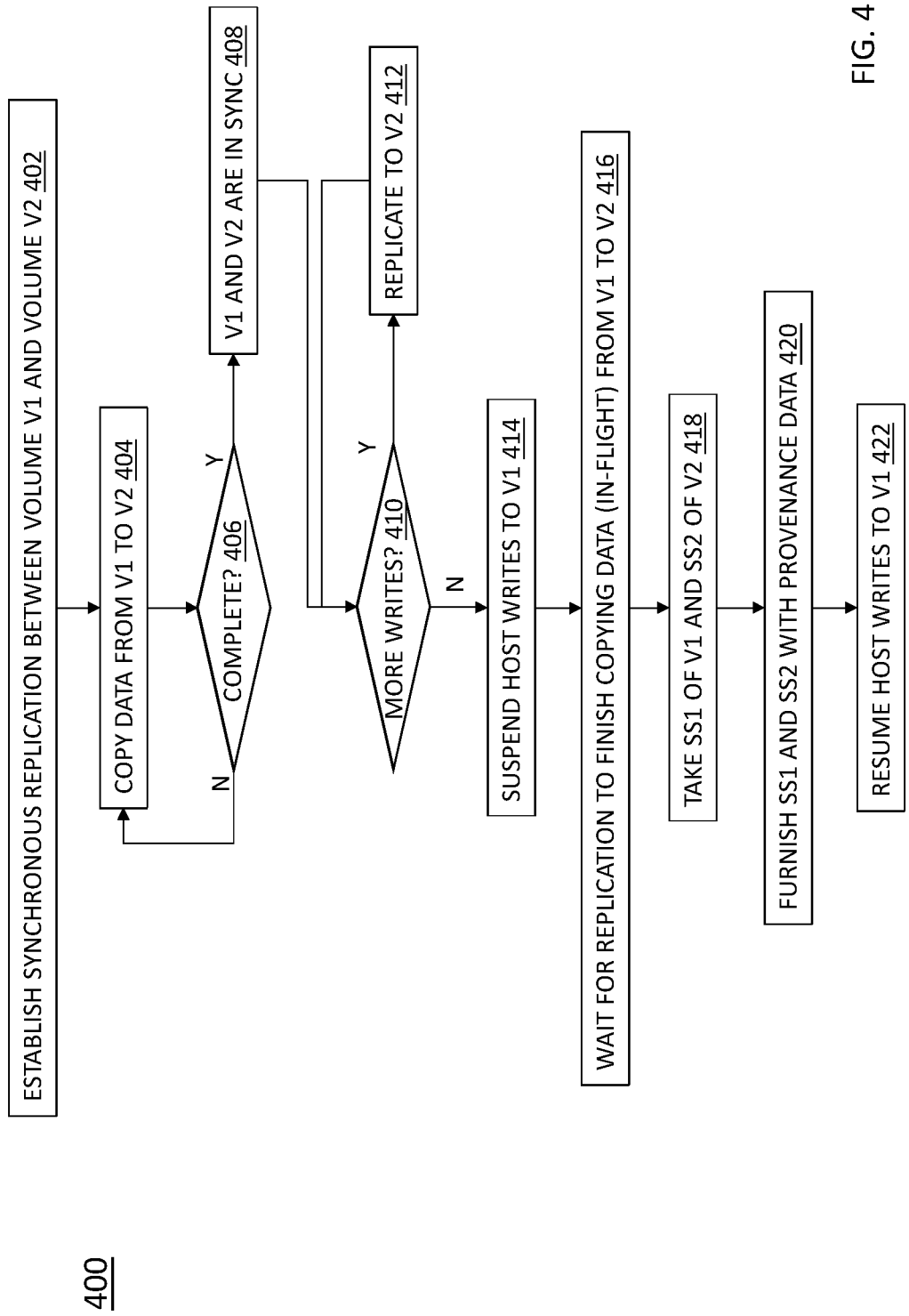
FIG. 4 is a flow diagram of a process for establishing an in-sync attribute for use in performing provenance-based replication in accordance with an embodiment.
Figure 5:
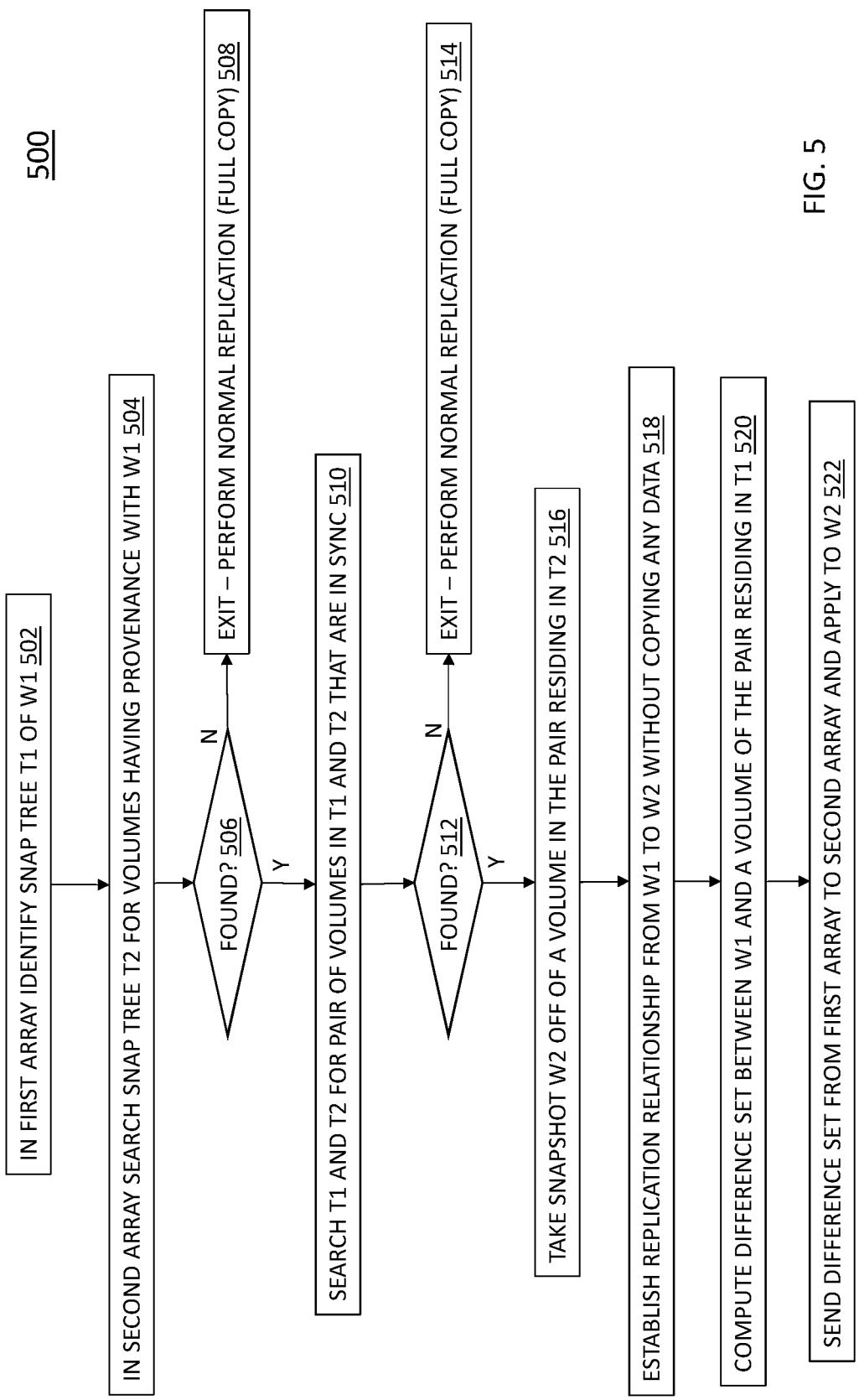
FIG. 5 is a flow diagram of a process for replicating from an immutable volume in a first storage array to a second storage array from an established in-sync attribute in accordance with an embodiment.
Figure 6:
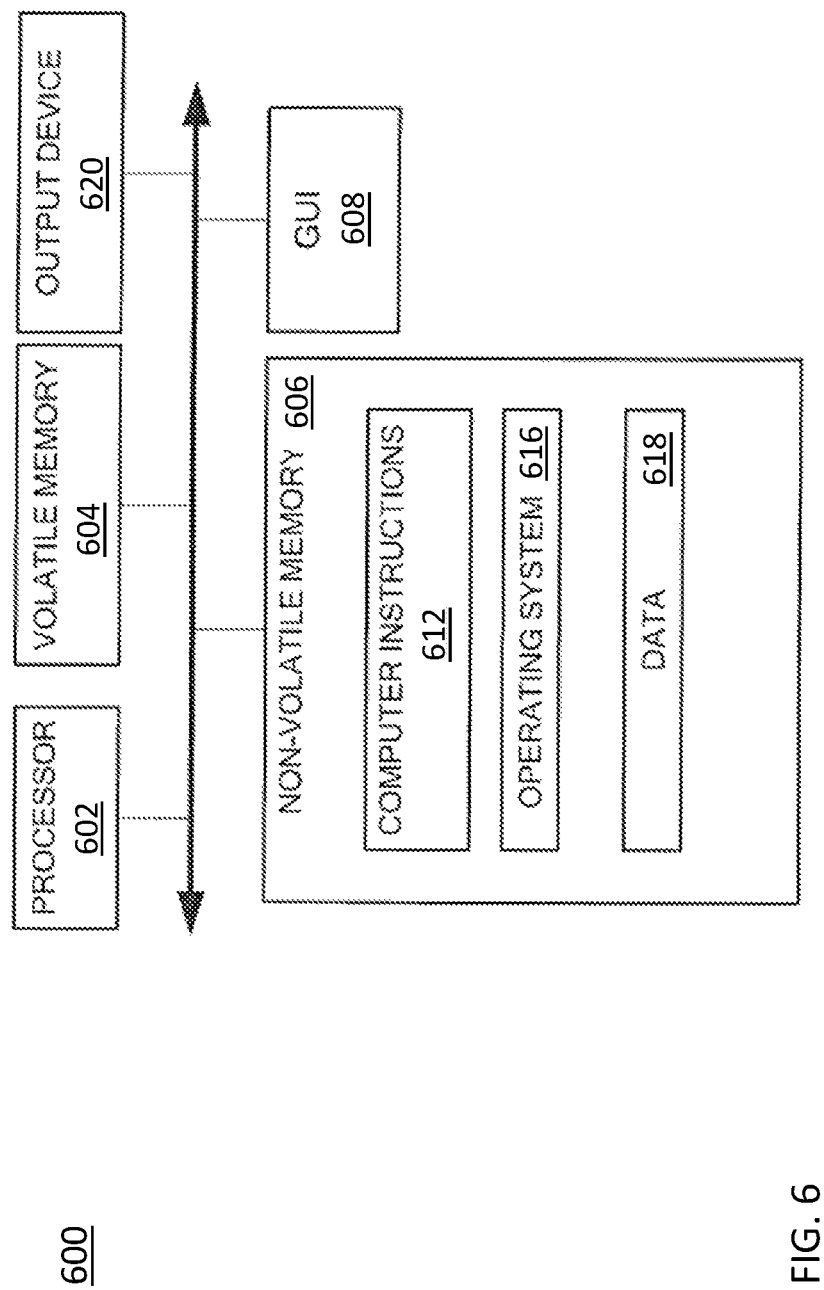
Figure 7:
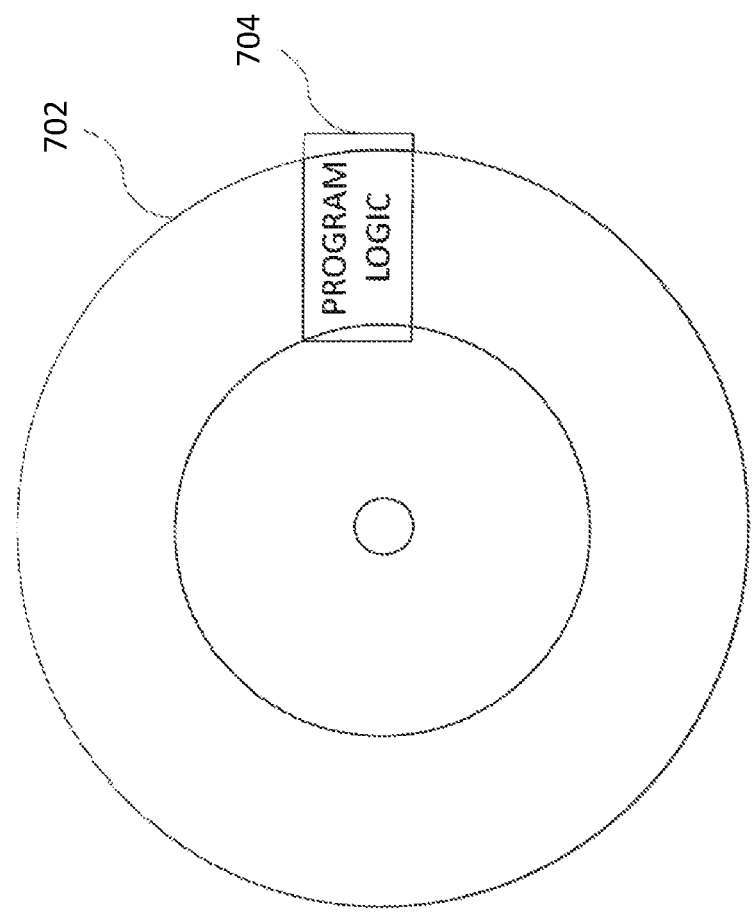

FIG. 6 is a block diagram of a hardware device that may perform at least a portion of the processes shown in FIGS. 4 and 5; and FIG. 7 a simplified block diagram of an apparatus that may be used to implement at least a portion of the systems and data structures of FIGS. 1-3 and 6 and at least a portion of the processes of FIGS. 4 and 5.

DETAILED DESCRIPTION

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "10 request" or simply "10" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data storage entity and/or storage unit may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Embodiments described herein provide provenance-based replication in a storage system environment. The provenance-based replication utilizes ancestry information of replicated volumes to identify relationships which can then be used to optimize data transfer, recover from data loss in a storage device, and recover various lost configuration information. For instance, examples of configuration information may include the pairing of replicated volumes between two storage systems, the association of a volume with a snap tree, and the relationship between two volumes in a snap tree, to name a few. Ancestry information can include any current and/or previous relationship identified between two or more entities (e.g., snap trees, volumes, and snapsets). Relationships can be identified in several ways. For example, two seemingly independent volumes on a target site can be related by being snapshots of the same volume on the source site but at different points in time. A pair of volumes (in the source and target) may currently be in sync or were in sync at some point in the past—thus, they may have similar but not identical data. It is also possible that a past replication relationship left two volumes with hidden underlying data. In addition, it is possible that a volume on the source site was replicated to one volume in the target and then to another volume in the target. Further, it is possible that a snapshot of a volume became an independent volume with a new identity. In all of these cases it may result in seemingly unrelated volumes that, in fact, have related data, which may sometimes be identical and other times be almost identical e.g., from different points in time.

The embodiments described herein illustrate provenance-based replication configured for a content-based storage system, such as XtremIO by DELL Corporation of Hopkinton, Mass.; however, it the embodiments are not limited thereto. It will be understood that other storage system architectures can be used to implement the provenance-based replication in order to realize the advantages of the embodiments described herein.

Figure 1:
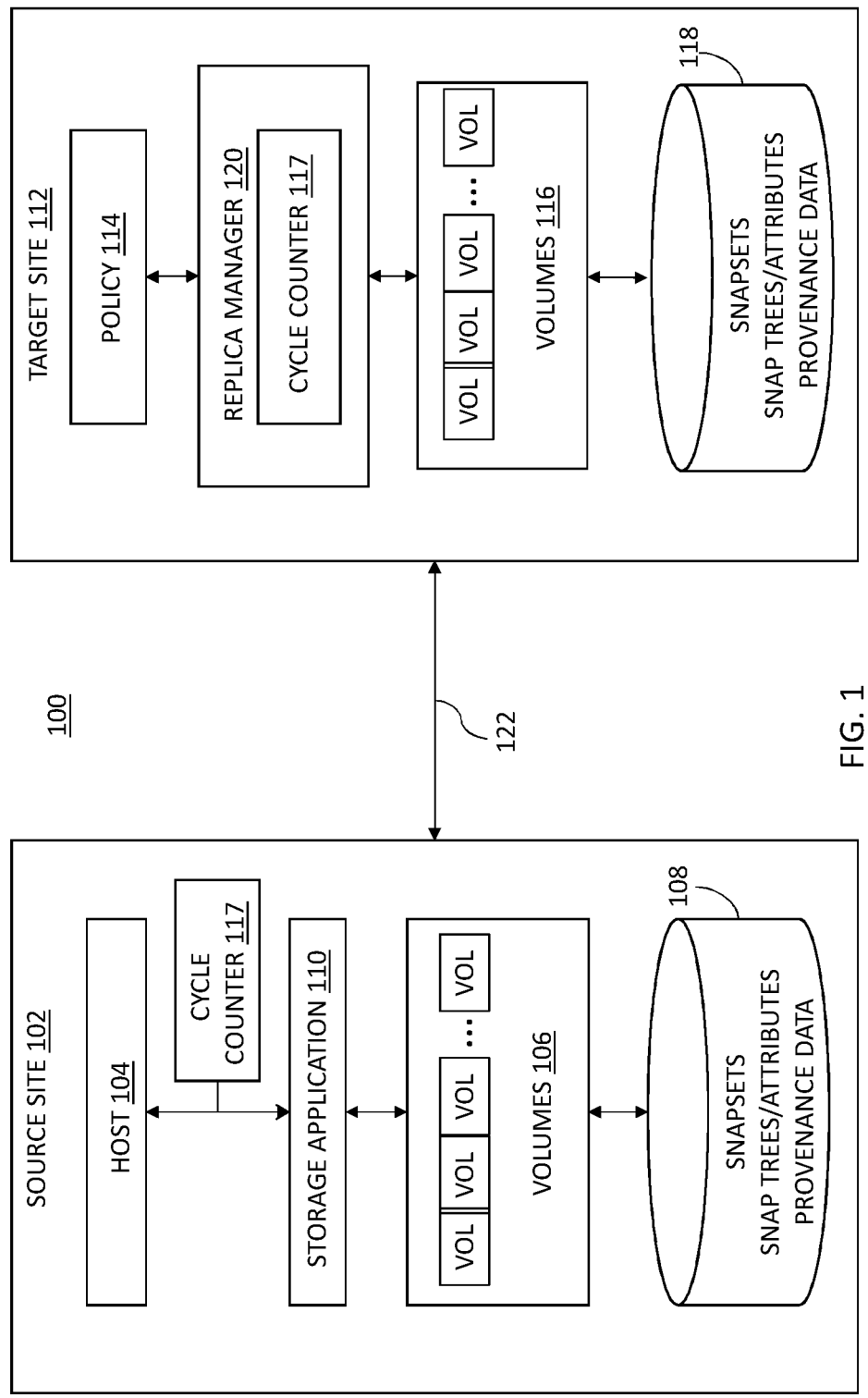
FIG. 1 is a block diagram of a storage system to perform provenance-based replication in accordance with an illustrative embodiment.

Turning now to FIG. 1, an example storage system 100 for implementing provenance-based replication will now be described. Storage system 100 may include at least one source site 102 and at least one target site 112. In an embodiment, target site 112 is either co-located with source site 102 or is in close geographic proximity (e.g., within the same building or building complex) with the source site 102. In other embodiments, target site 112 is remotely located from the source site 102. For example, target site 112 may be geographically dispersed across cities, states, or even countries with respect to source site 102.

Source site 102 may include a host 104, storage application 110, and storage device 106. In embodiments, the storage device 106 stores one or more storage volumes V1-Vn that operate as active or production volumes. The volumes may include physical volumes and/or virtual volumes.

Host 104 may perform I/O operations on storage device 106 (e.g., read data from and write data to storage device 106). In some embodiments, the I/O operations may be intercepted by and controlled by the storage application 110. As changes are made to data stored on storage device 106 via the I/O operations from host 104, or over time as storage system 100 operates, storage application 106 may perform data replication from the source site 102 to the target site 112 over a communication network 122. The source site may also include a cycle counter 117 to track generations of snap sets over time, e.g., via the storage application 110, as will be described further herein.

In some embodiments, the communication network 122 may include internal (e.g., short distance) communication links (not shown) to transfer data between storage volumes for storing replicas (also referred to herein as snap sets), such as an InfiniBand (IB) link or Fibre Channel (FC) link. In other embodiments, the communication network 122 may be a long-distance communication network of a storage area network (SAN), e.g., over an Ethernet or Internet (e.g., TCP/IP) link that may employ, for example, the iSCSI protocol.

In illustrative embodiments, storage system 100 may employ a snap set (or replication) mechanism to replicate data between source site 102 and target site 112. A snapshot (or replica) may be created from data within storage device 106 and transferred to the target site 112 during a data replication cycle by data replication. Snapsets may be stored on the source site 102 and/or target site 112 in one or more storage units, such as storage 108 and 118. Also stored in the one or more storage units are snap trees and a provenance data, which are configured for use in implementing the provenance-based replication, as will be described further herein.

Data replication may be performed based on data replication policies that may define various settings for data recovery operations, shown as policy 114 in target site 112. For example, policy 114 may define a plurality of attributes, such as a frequency with which replicas are generated and how long each snap shot is kept at the target site 112.

As described herein, in example embodiments, data replication may be synchronous data replication or metro replication with snap sets created in dynamic intervals during operation of storage system 100. The timing of synchronous replication cycles and the retention of the snap shots may be managed by a replica manager 120 of target site 112. In other embodiments, the data replication may be asynchronous data replication.

In addition to managing replicas (e.g., snap sets stored in the storage 118 at the target site 112) according to a policy 114 (e.g., a replication and/or retention policy), the replica manager 120 may also include a cycle counter 117 to track generations of snap sets over time, as will be described further herein.

The storage application 110 and/or replica manager 120 may be provided as software components, e.g., computer program code that, when executed on a processor, may cause a computer to perform functionality described herein. In a certain embodiment, the storage system 100 includes an operating system (OS) (shown generally in "last fig of spec"), and the storage application 110 and/or replica manager 120 may be provided as user space processes executable by the OS. In other embodiments, one or more of the storage application 110 and the replica manager 120 may be provided, at least in part, as hardware, such as digital signal processor (DSP) or an application specific integrated circuit (ASIC) configured to perform functionality described herein. It is understood that the storage application 110 and/or replica manager 120 may be implemented as a combination of software components and hardware components.

Figure 2:
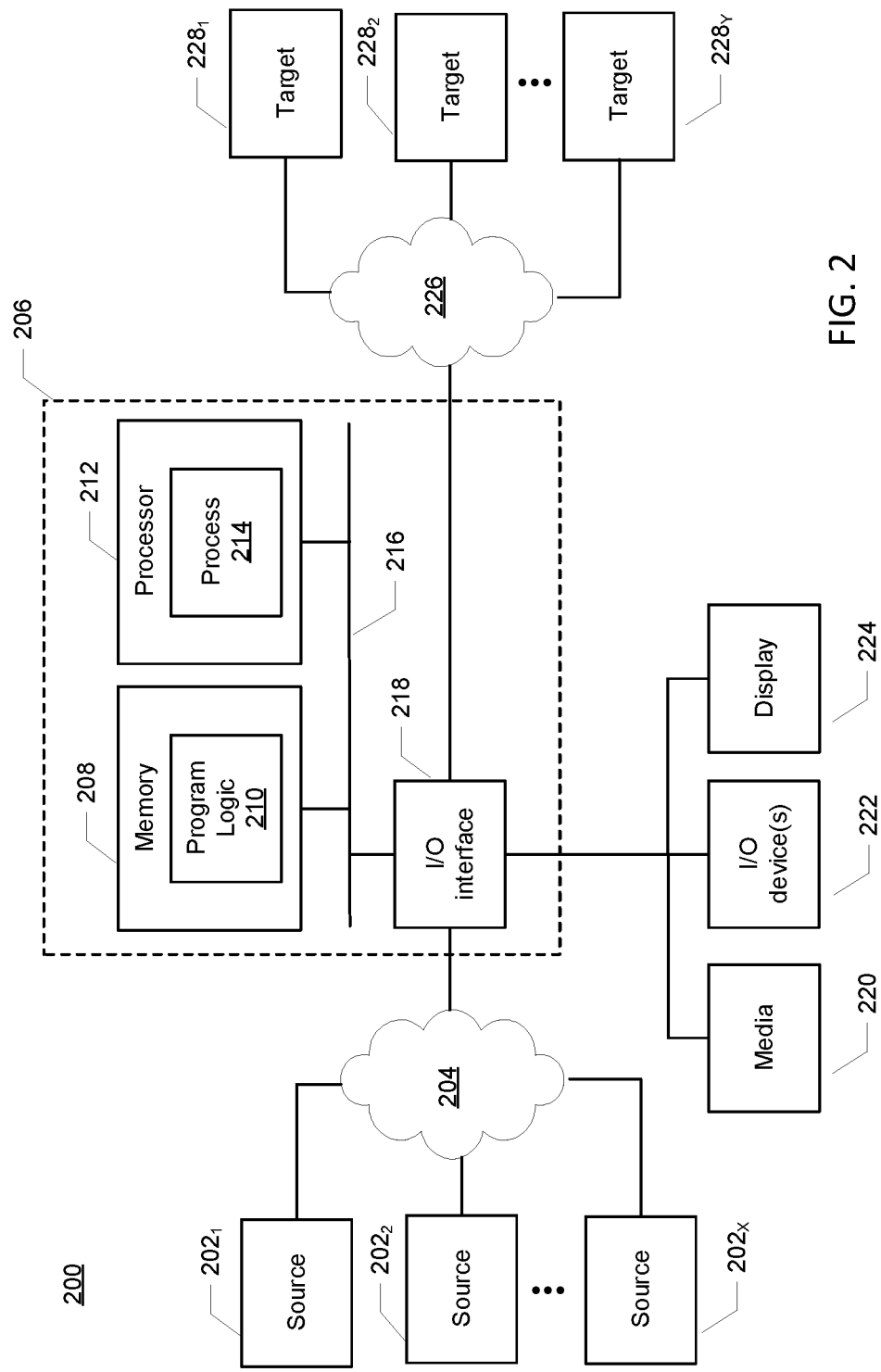
FIG. 2 is a block diagram of another storage system to perform provenance-based replication in accordance with an illustrative embodiment.

Referring to FIG. 2, in an illustrative embodiment, an apparatus 206 may form part of system 200 and include a memory 208 storing program logic 210, a processor 212 for executing a process 214, and a communications I/O interface 218, connected via a bus 216 to allow communication between memory 208, processor 212 and devices external to apparatus 206. Apparatus 206 may correspond to elements of the source site 102 of FIG. 1. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via a network 204. Source devices $202_1$-$202_X$ may correspond to elements of the source site 102 in FIG. 1. In some embodiments, communications I/O interface 218 may couple apparatus 206 to one or more target devices $228_1$-$228_Y$ via networks 226. Target devices $228_1$-$228_Y$ may correspond to elements of the target site 112 in FIG. 1. In some embodiments, networks 226 of FIG. 2 may include a communication fabric between volumes of targets 228. For example, in some embodiments, networks 226 may include an Infini-Band (IB) network or a Fibre Channel (FC) network. Networks 226 may also include a long-distance communication network of a storage area network (SAN), e.g., over an Ethernet or Internet (e.g., TCP/IP) link that may employ, for example, the iSCSI protocol.

As indicated above with respect to FIG. 1, volumes on the source site 102 may be replicated to the target site 112 as one or more corresponding volumes in storage device 116 at the target site 112. In a replication setup, it may be that one or more of the source volumes may have relationships (e.g., ascertained from ancestry information, also referred to as "provenance information") with one or more other source volumes, as well as one or more target volumes. In embodiments, the provenance-based replication provides a technique for identifying, managing, and processing ancestry information among the volumes to determine these relationships. In embodiments, the provenance based replication techniques utilize one or more data structures, e.g., data structures 300A and 300B, as well as attributes 310 (300C), as shown in FIGS. 3A-3C to identify and track ancestry information within and between storage systems. This ancestry information may be used to optimize data transfer, recover from data loss, and recover lost configuration information.

The data structures 300A and 300B may be represented as snap trees, each of which includes nodes 302 representing volumes and volume dependencies in parent/child relationships as illustrated by connectors, or branches, 304 extending there between. Snap tree 300A represents a source snap tree for volumes corresponding to a source site, and snap tree 300B represents a target, or destination, snap tree for volumes corresponding to a target site.

In snap trees 300A and 300B, embodiments enable assignment of attributes or identifiers 310 to the trees themselves, as well as certain nodes in the trees based on known or discovered relationships among the nodes and trees. Ancestry information is derived for the volumes and used to ascertain these relationships. Attributes may include a volume identifier (ID) 312, in sync attribute 314, a snapgroup pairing identifier 316, a snap tree identifier 318, and a volume pairing identifier 320. Other attributes may include a lag time 322 associated with a replication operation between a source node volume and a destination node volume, a time 324 in which the lag was recorded, and a time 326 in which corresponding data between the nodes was last in sync.

As indicated above, in a storage system that performs replication, it is desirable to be able to have the ancestry information for replicated volumes in order to determine various relationships. For example, two seemingly independent volumes on a target site can be related by being snapshots of the same volume on the source site but at different points in time. A pair of volumes (in the source and target) may currently be in sync or were in sync at some point in the past—thus, they may have similar but not identical data. It is also possible that a past replication relationship left two volumes with hidden identical or mostly identical underlying data. In addition, it is possible that a volume on the source site was replicated to one volume in the target and then to another volume in the target. Further, it is possible that a snapshot of a volume became an independent volume with a new identity. In all of these cases it may result in seemingly unrelated volumes that, in fact, have related data, which may sometimes be identical and other times be almost identical e.g., from different points in time.

This provenance information can be used in various scenarios. For example, in one scenario, in a hash-based replication setup, if a target volume has a provenance relationship with the source volume, data transfer may be optimized by either finding a common ancestor and transmitting the differences or optimizing transfer using hash signatures. In another scenario, the provenance information can be used to recover from data loss in a storage device (e.g., if data is lost in a first storage device, the system can search a second storage device for all volumes (e.g., using the volume ID 312 in FIG. 3 with a provenance relationship with the lost data (e.g., volume) and find among them the best candidate for recovery. The provenance information used may include the lag time 322 between the two volumes (latency between the source and target systems/amount of time to replicate changes to the target system), and the time 324 the lag was recorded, as well as the last time 326 the two volumes were in sync (if at all). When configuration information has been lost, the replication configuration information may be reconstructed using the volume pairing identifier 320, the snap tree pairing identifier 316, and the snap tree identifier 318 which may be stored in the arrays (e.g., source site and target site).

In an embodiment, suppose the replication setup is Native Replication of XtremIO where volumes and snapshots are arranged in a snap tree (also referred to as snapgroup). As shown in FIG. 3, a volume V1 is in snap tree T1, which tree may reside in source storage device S1 at the source site. This volume V1 is replicated (through sync, async, etc.) to volume V2 in snap tree T2 in target storage T2. The provenance-based replication process adds a globally unique snap tree identifier 318 (ST-1100) to T1 and another (ST-1101) to T2, as shown in snap trees 300A and 300B of FIG. 3. Note that these identifiers 318 are different for each tree T1 and T2 so as to enable the system to uniquely identify each tree. In addition, as shown in FIG. 3, a common snap tree pairing identifier 316 (SPI-700) is assigned to both of the trees. The common snap tree pairing identifier 316 enables the system to identify which snap trees have common provenance or ancestry information. Thus, as shown in FIGS. 3A-3B, T1 and T2 are known to have a provenance relationship. For each volume in each tree, a unique volume identifier is assigned. As shown in FIGS. 3A and 3B, a volume identifier 312 (VOL-1200) is assigned to V1 in T1 and a different volume identifier 312 (VOL-1201) is assigned to V2 in T2. For both volumes V1 and V2, a volume pairing identifier and in sync attribute are added The volume pairing identifier 320 represents a unique identifier for V1 and V2 that indicates a provenance relationship between V1 and V2. This enables retrieval of the pairing configuration of V1 and V2 if configuration data is lost, e.g., if a management program (e.g., XMS) database has been corrupted. As shown in FIG. 3, a common volume pairing identifier 320 (VP-900) is assigned to both V1 and V2.

The snap tree pairing identifier 316 enables each side (source and target) to have information of the snap tree of its peer. For example, if another volume V1' is replicated to V2', it is easy to see if V2 and V2' are in the same snap tree on the target. If they are, the replication can use this to optimize data transfer, since the volumes may contain some shared information which means that copying from one volume to the other would require less time and less data to be transferred (i.e., only the differences between the volumes would need to be copied). Also, if V1 and V1' are lost, V2 and V2' may be good candidates for data recovery.

With regard to the in sync attribute 314, if the two volumes V1 and V2 are determined to be in sync (have the same data) and are read-only, both are marked with the in sync attribute 314 (INA-800), as shown in FIG. 3. This attribute is revoked if either volume becomes writeable. In order for this attribute to be valid, it has to be set on both sides. If one side has the attribute set and the other has it clear, it is determined the two volumes may not be in sync. For example, if the two volumes are read-only snapshots that were created during sync or async replication, they may be determined to be in sync. Upon system recovery from a replication error, this attribute can be used to determine that these volumes do not need to be synchronized.

Further, this attribute can be used to initiate incremental resynchronization for any dependent volumes. For example, suppose one needs to synchronize (copy) a volume V1* from source to target. Suppose that V1* is derived from V1, and V1 is synchronized with V2 on the target. The process can create a snap copy V2* of V2 on the target, as shown in FIG. 3, copy the differences between V1* and V1 to V2*, and when this difference copy is complete, V2* will be an exact copy of V1*.

Turning now to FIG. 4, a process 400 for establishing the in sync attribute will now be described in accordance with an embodiment. In block 402, the process 400 establishes synchronous replication between source volume V1 in a source array and a target volume V2 in another array.

In block 404, data is copied from V1 to V2. The process 400 waits for replication to finish copying data from V1 to V2. In block 406, the process 400 determines if the copying from V1 to V2 is complete. If not, the process 400 returns to block 404. Otherwise, if the copying is complete, the V1 and V2 are now synchronized in block 408; however, the host may continue to write to V1.

In block 410, the process 400 determines if the host has continued to write to Vi. If so, in block 412, the writes are replicated to V2 and the process returns to block 410. Otherwise, if no more writes are sent by the host in block 410, the host suspends writes to V1 in block 414.

In block 416, the process waits until all in-flight replication operations from V1 to V2 are complete. Once complete, in block 418, the process 400 takes a snapshot SS1 of V1 and a snapshot SS2 of V2 in block 418. In block 420, the process 400 furnishes SS1 and SS2 (e.g., via the snap trees of FIG. 3) with provenance data, such as the snap tree pairing identifier 316, the snap tree identifiers 318, the current time and date, and in sync attribute 314. In block 422, the process 500 resumes writes to V1.

The information supplied to the snapshots SS1 and SS2 via the snap trees can be used to replicate from an immutable volume (W1) in a first storage array to a second storage array. An immutable volume refers to a read-only volume, i.e., it cannot be modified by the host or an internal process. FIG. 5 illustrates a process 500 that can take an immutable volume in one system and efficiently create an exact replica of it on the target side. Turning now to FIG. 5, a flow diagram describing the process 500 will now be described.

In block 502, in the first array, the process 500 identifies the snap tree (e.g., T1) of W1. In the second array, the process 500 searches a snap tree (e.g., T2) to determine whether the tree T2 contains volumes that have some common provenance with W1 in block 504. In block 506, the process determines if common provenance information in the second storage array has been found. If no common provenance is found in block 506, the process 500 exits in block 508. In this situation, normal replication (e.g., a full copy) is performed.

On the other hand, if provenance information is found, in block 510, the process 500 searches T1 and T2 for a pair of volumes in T1 and T2 (e.g., one in T1 and one in T2) such that the pair are in sync with each other. In block 512, the process 500 determines if the pair of volumes exists. If not, the process 500 exits in block 514 (and normal replication—a full copy—is performed. Otherwise, in block 512 if the pair of volumes exists (i.e., are in sync), the process 500 takes a snapshot W2 off of the volume in the pair that resides in T2 in block 516.

The process 500 establishes a replication relationship from W1 to W2 without copying any data in block 518. In block 520, the process 500 computes the difference (difference set) between W1 and the volume of the pair residing in T1. The process 500 sends the difference set from the first storage array to the second storage array and applies the difference set to W2 in block 522. When this step completes, W2 will have identical data to W1.

Referring to FIGS. 1 and 6, in some embodiments, the source site 102 and/or target site 112 of FIG. 1 may be implemented as one or more computers, as shown in FIG. 6. Computer 600 may include processor 602, volatile memory 604 (e.g., RAM), non-volatile memory 606 (e.g., a hard disk drive, solid state drive such as a flash drive, a hybrid magnetic and solid state drive, etc.), graphical user interface (GUI) 608 (e.g., a mouse, a keyboard, a display, and so forth) and input/output (I/O) device 620. Non-volatile memory 606 stores computer instructions 612, an operating system 616 and data 618 such that, for example, the computer instructions 612 are executed by the processor 602 out of volatile memory 604 to perform at least a portion of the processes 400 and 500 shown in respective FIGS. 4 and 5. Program code may be applied to data entered using an input device of GUI 608 or received from I/O device 620.

Processes 400 and 500 shown in FIGS. 4 and 5 are not limited to use with the hardware and software of FIG. 6 and may find applicability in any computing or processing environment and with any type of machine or set of machines that is capable of running a computer program. Processes 400 and 500 may be implemented in hardware, software, or a combination of the two.

The processes described herein are not limited to the specific embodiments described. For example, processes 400-500 are not limited to the specific processing order shown in FIGS. 4 and 5. Rather, one or more blocks of processes 400-500 may be re-ordered, combined or removed, performed in parallel or in serial, as necessary, to achieve the results set forth herein.

Processor 602 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow charts of FIGS. 4 and 5, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 7 shows Program Logic 704 embodied on a computer-readable medium 702 as shown, and wherein the Logic is encoded in computer-executable code configured for carrying out the reservation service process of this invention and thereby forming a Computer Program Product 700. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for implementing provenance-based replication in a storage system, the method comprising:

assigning a globally unique identifier (GUID) to a first snap tree of a first storage array and another GUID to a second snap tree of a second storage array, wherein the first snap tree and the second snap tree are peers of each other with respect to at least one volume replicated between the first storage array and the second storage array;

for each volume (Vj) of a plurality of volumes in the first storage array that is replicated to a corresponding volume (Vi) of a plurality of volumes in the second storage array, assigning a volume pairing identifier (ID) common to both of the volume Vj and the volume Vi;

upon determining data for a volume (V1) of the plurality of volumes in the first storage array has been lost or corrupted:

identifying the peer snap tree from the GUID of the peer snap tree and using the volume pairing ID of the volume V1 to search the peer snap tree for a volume (V2) of the plurality of volumes in the second storage array, the volume V2 sharing the volume pairing ID of the volume V1;

retrieving data for the volume V2 and computing a delta between the data of the volume V1 and the data of the volume V2; and reconstructing the lost or corrupted data for the volume V1 using the delta.

2. The method of claim 1, further comprising:

upon determining the volume V1 and the volume V2 are in sync and are read-only, setting an in-sync attribute to both the volume V1 and the volume V2 indicating the volume V1 and the volume V2 are currently in sync;

in response to performing a system recovery operation: and accessing the in-sync attribute for the volume V1 and the volume V2;

upon determining the in-sync attribute is set for both the volume V1 and the volume V2, bypassing a resynchronization operation on the volume V1 and the volume V2; and upon determining the in-sync attribute is not set for at least one of the volume V1 and the volume V2, performing the resynchronization operation on the volume V1 and the volume V2.

3. The method of claim 2, further comprising:

upon determining, during replication operations, at least one of the volume V1 and the volume V2 is out of sync, revoking the in-sync attribute for the volume V1 and the volume V2.

4. The method of claim 2, further comprising establishing the in-sync attribute for the volume V1 and the volume V2 during synchronous replication, the establishing comprising:

copying data from the volume V1 to the volume V2;

waiting for replication to finish copying the data from the volume V1 to the volume V2;

for writes received at the volume V1 from a host after completion of the copying from the volume V1 to the volume V2, replicating the writes from the volume V1 to the volume V2;

suspending, by the host, further writes to the volume V1;

upon completion of replicating in-flight replication operations from the volume V1 to the volume V2, taking a snapshot of the volume V1 and taking a snapshot of the volume V2;

providing provenance data to the snapshot of the volume V1 and the snapshot of the volume V2, the provenance data including at least one of the GUID of the first snap tree and the second snap tree, a shared GUID pairing identifier of the first snap tree and the second snap tree, a current time and date, and the in-sync attribute; and resuming writes from the host to the volume V1.

5. The method of claim 4, wherein the shared GUID pairing identifier indicates that common ancestry data exists between the first snap tree and the second snap tree.

6. The method of claim 4, further comprising replicating from an immutable volume (W1) in the first storage array to the second storage array, the replicating comprising:
identifying, in the first storage array, the first snap tree corresponding to the volume W1;
searching, in the second storage array, the second snap tree for volumes having common provenance data with provenance data of the volume W1; and
upon determining no common provenance data is found in the second storage array, performing a full copy replication of the volume W1.

7. The method of claim 6, further comprising:
upon determining common provenance is found in the second storage array, searching the first snap tree and the second snap tree for a set of volumes that are in sync with each other;
if no set of volumes are found to be in sync with each other, performing a full copy replication of volume W1;
if the set of volumes are found to be in sync with each other:
taking a snapshot of a volume (W2) off of a volume in the set residing in the second storage array;
establishing a replication relationship from the volume W1 to the volume W2 without copying data;
computing a difference set between the volume W1 and a volume of the set residing in the first storage array;
sending the difference set to the second storage array; and
applying the difference set to the volume W2, the applying rendering the volume W2 and the volume W1 to be in sync.

8. A system for implementing provenance-based replication, the system comprising:
a memory comprising computer-executable instructions; and
a processor operable by a storage system, the processor executing the computer-executable instructions, the computer-executable instructions when executed by the processor cause the processor to perform operations comprising:
assigning a globally unique identifier (GUID) to a first snap tree of a first storage array and another GUID to a second snap tree of a second storage array, wherein the first snap tree and the second snap tree are peers of each other with respect to at least one volume replicated between the first storage array and the second storage array;
for each volume (Vj) of a plurality of volumes in the first storage array that is replicated to a corresponding volume (Vi) of a plurality of volumes in the second storage array, assigning a volume pairing identifier (ID) common to both of the volume Vj and the volume Vi;
upon determining data for a volume (V1) of the plurality of volumes in the first storage array has been lost or corrupted:
identifying the peer snap tree from the GUID of the peer snap tree and using the volume pairing ID of the volume V1 to search the peer snap tree for a volume (V2) of the plurality of volumes in the second storage array, the volume V2 sharing the volume pairing ID of the volume V1;
retrieving data for the volume V2 and computing a delta between the data of the volume V1 and the data of the volume V2; and
reconstructing the lost or corrupted data for the volume V1 using the delta.

9. The system of claim 8, wherein the operations further comprise:
upon determining the volume V1 and the volume V2 are in sync and are read-only, setting an in-sync attribute to both the volume V1 and the volume V2 indicating the volume V1 and the volume V2 are currently in sync;
in response to performing a system recovery operation: and
accessing the in-sync attribute for the volume V1 and the volume V2;
upon determining the in-sync attribute is set for both the volume V1 and the volume V2, bypassing a resynchronization operation on the volume V1 and the volume V2; and
upon determining the in-sync attribute is not set for at least one of the volume V1 and the volume V2, performing the resynchronization operation on the volume V1 and the volume V2.

10. The system of claim 9, wherein the operations further comprise:
upon determining, during replication operations, at least one of the volume V1 and the volume V2 is out of sync, revoking the in-sync attribute for the volume V1 and the volume V2.

11. The system of claim 9, wherein the operations further comprise establishing the in-sync attribute for the volume V1 and the volume V2 during synchronous replication, the establishing comprising:
copying data from the volume V1 to the volume V2;
waiting for replication to finish copying the data from the volume V1 to the volume V2;
for writes received at the volume V1 from a host after completion of the copying from the volume V1 to the volume V2, replicating the writes from the volume V1 to the volume V2;
suspending, by the host, further writes to the volume V1;
upon completion of replicating in-flight replication operations from the volume V1 to the volume V2, taking a snapshot of the volume V1 and taking a snapshot of the volume V2;
providing provenance data to the snapshot of the volume V1 and the snapshot of the volume V2, the provenance data including at least one of the GUID of the first snap tree and the second snap tree, a shared GUID pairing identifier of the first snap tree and the second snap tree, a current time and date, and the in-sync attribute; and
resuming writes from the host to the volume V1.

12. The system of claim 11, wherein the shared GUID pairing identifier indicates common ancestry data exists between the first snap tree and the second snap tree.

13. The system of claim 11, wherein the operations further comprise replicating from an immutable volume (W1) in the first storage array to the second storage array, the replicating comprising:
identifying, in the first storage array, the first snap tree corresponding to the volume W1;
searching, in the second storage array, the second snap tree for volumes having common provenance data with provenance data of the volume W1; and upon determining no common provenance data is found in the second storage array, performing a full copy replication of the volume W1.

14. The system of claim 13, wherein the operations further comprise:
upon determining common provenance is found in the second storage array, searching the first snap tree and the second snap tree for a set of volumes that are in sync with each other;
if no set of volumes are found to be in sync with each other, performing a full copy replication of volume W1;
if the set of volumes are found to be in sync with each other:
taking a snapshot of a volume (W2) off of a volume in the set residing in the second storage array;
establishing a replication relationship from the volume W1 to the volume W2 without copying data;
computing a difference set between the volume W1 and a volume of the set residing in the first storage array;
sending the difference set to the second storage array; and
applying the difference set to the volume W2, the applying rendering the volume W2 and the volume W1 to be in sync.

15. A computer program product for implementing provenance-based replication, the computer program product embodied on a non-transitory computer readable medium, the computer program product including instructions that, when executed by a computer, causes the computer to perform operations comprising:
assigning a globally unique identifier (GUID) to a first snap tree of a first storage array and another GUID to a second snap tree of a second storage array, wherein the first snap tree and the second snap tree are peers of each other with respect to at least one volume replicated between the first storage array and the second storage array;
for each volume (Vj) of a plurality of volumes in the first storage array that is replicated to a corresponding volume (Vi) of a plurality of volumes in the second storage array, assigning a volume pairing identifier (ID) common to both of the volume Vj and the volume Vi;
upon determining data for a volume (V1) of the plurality of volumes in the first storage array has been lost or corrupted:
identifying the peer snap tree from the GUID of the peer snap tree and using the volume pairing ID of the volume V1 to search the peer snap tree for a volume (V2) of the plurality of volumes in the second storage array, the volume V2 sharing the volume pairing ID of the volume V1;
retrieving data for the volume V2 and computing a delta between the data of the volume V1 and the data of the volume V2; and
reconstructing the lost or corrupted data for the volume V1 using the delta.

16. The computer program product of claim 15, wherein the operations further comprise:
upon determining the volume V1 and the volume V2 are in sync and are read-only, setting an in-sync attribute to both the volume V1 and the volume V2 indicating the volume V1 and the volume V2 are currently in sync;
in response to performing a system recovery operation: and
accessing the in-sync attribute for the volume V1 and the volume V2;

upon determining the in-sync attribute is set for both the volume V1 and the volume V2, bypassing a resynchronization operation on the volume V1 and the volume V2; and
upon determining the in-sync attribute is not set for at least one of the volume V1 and the volume V2, performing the resynchronization operation on the volume V1 and the volume V2.

17. The computer program product of claim 16, wherein the operations further comprise:
upon determining, during replication operations, at least one of the volume V1 and the volume V2 is out of sync, revoking the in-sync attribute for the volume V1 and the volume V2.

18. The computer program product of claim 16, wherein the operations further comprise establishing the in-sync attribute for the volume V1 and the volume V2 during synchronous replication, the establishing comprising:
copying data from the volume V1 to the volume V2;
waiting for replication to finish copying the data from the volume V1 to the volume V2;
for writes received at the volume V1 from a host after completion of the copying from the volume V1 to the volume V2, replicating the writes from the volume V1 to the volume V2;
suspending, by the host, further writes to the volume V1;
upon completion of replicating in-flight replication operations from the volume V1 to the volume V2, taking a snapshot of the volume V1 and taking a snapshot of the volume V2;
providing provenance data to the snapshot of the volume V1 and the snapshot of the volume V2, the provenance data including at least one of the GUID of the first snap tree and the second snap tree, a shared GUID pairing identifier of the first snap tree and the second snap tree, a current time and date, and the in-sync attribute; and
resuming writes from the host to the volume V1.

19. The computer program product of claim 18, wherein the shared GUID pairing identifier indicates common ancestry data exists between the first snap tree and the second snap tree.

20. The computer program product of claim 18, wherein the operations further comprise replicating from an immutable volume (W1) in the first storage array to the second storage array, the replicating comprising:
identifying, in the first storage array, the first snap tree corresponding to the volume W1;
searching, in the second storage array, the second snap tree for volumes having common provenance data with provenance data of the volume W1; and
upon determining no common provenance data is found in the second storage array, performing a full copy replication of the volume W1;
upon determining common provenance is found in the second storage array, searching the first snap tree and the second snap tree for a set of volumes that are in sync with each other;
if no set of volumes are found to be in sync with each other, performing a full copy replication of volume W1;
if the set of volumes are found to be in sync with each other:
taking a snapshot of a volume (W2) off of a volume in the set residing in the second storage array;
establishing a replication relationship from the volume W1 to the volume W2 without copying data;
computing a difference set between the volume W1 and a volume of the set residing in the first storage array;

sending the difference set to the second storage array; and applying the difference set to the volume W2, the applying rendering the volume W2 and the volume W1 to be in sync.

* * * * *